J. LAHAYE.
Car Brake.
No. 5,054.
Patented Apr. 10, 1847.
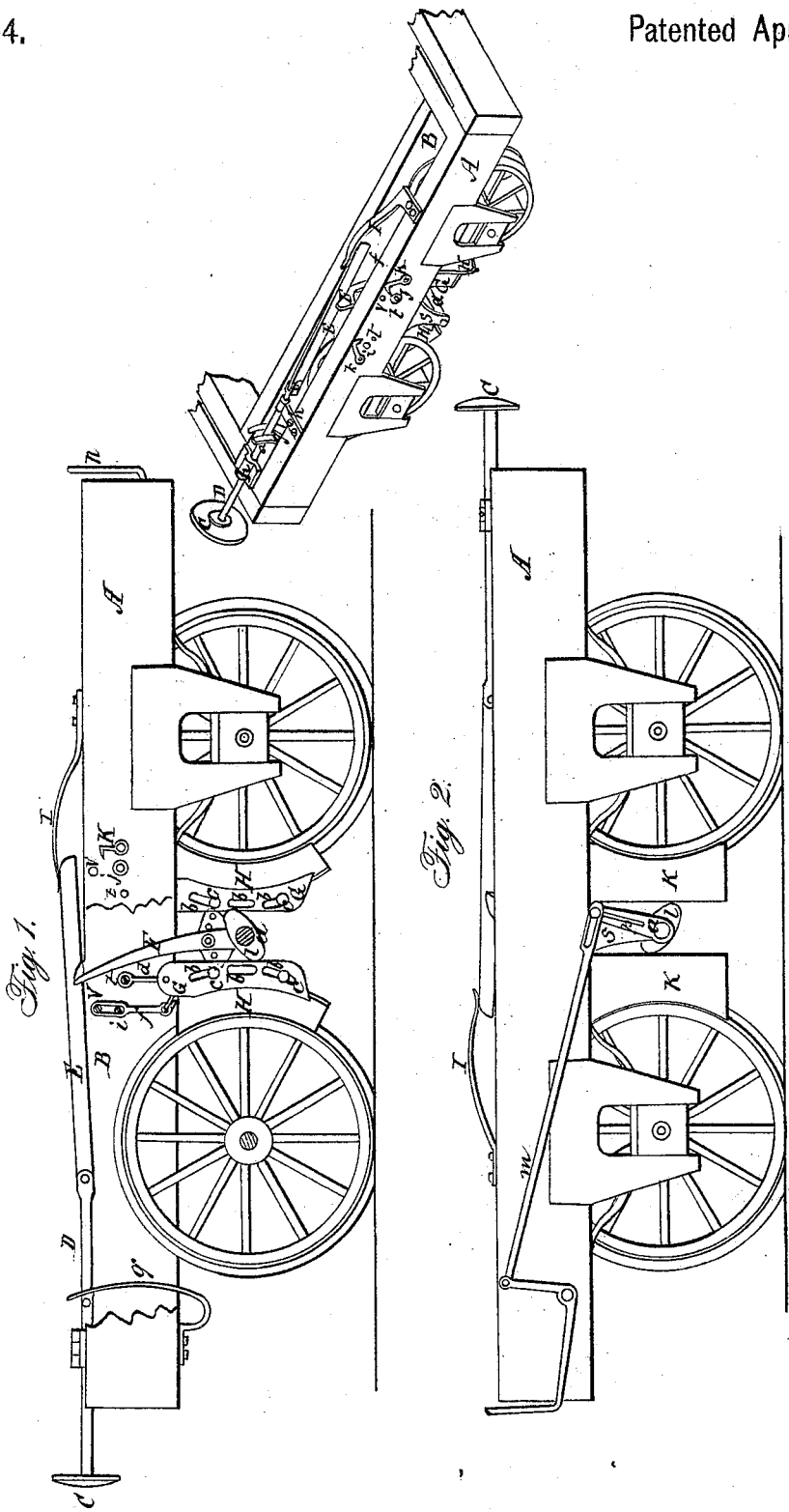

UNITED STATES PATENT OFFICE.

JNO. LAHAYE, OF READING, PENNSYLVANIA.

SELF-DETACHING BRAKE.

Specification forming part of Letters Patent No. 5,054, dated April 10, 1847; Reissued April 13, 1852, No. 216.

*To all whom it may concern:*

Be it known that I, JOHN LAHAYE, of Reading, in the county of Berks and State of Pennsylvania, have invented a new and Improved Self-Detaching Brake for Railroad-Cars; and I do hereby declare the following to be a full, clear, and exact description of the construction and operation thereof, reference being had to the accompanying drawings, making a part of this specification.

The nature of my invention consists in so constructing the brakes, that a reversed motion of the wheels of the car will throw them out of gear, and prevent their acting upon the wheels while the cars are moving in a backward direction.

In the accompanying drawings, Figure 1, is a side elevation of a railroad car frame, having my improved brake attached to it,— a portion of one of the side pieces of the frame being broken out for the purpose of showing parts of the brake that would otherwise be concealed. Fig. 2, is an elevation of the opposite side of the car frame. Fig. 3, is a perspective view of one side of a car frame, with my improved brake attached to the same.

The same letters refer to corresponding parts in all the figures.

A, and B, are side pieces of the car frame; C, is the bumper constructed in the usual manner; D, is the shaft of the bumper, working in the bearings $h$, $h$; E, is a bar connected by a hinge joint to the end of the bumper shaft D.

F, is a lever on the end of the vibrating shaft $n$; the shaft $a$, is supported by, and has its bearings in the supporters $s$, $s$, made fast to the side pieces A, A, of the car frame.

G, G, are metallic cases, or shoes, which receive the backs of the brakes or rubbers H, H, (allowing them free vertical play,) their backs bearing against the friction rollers $c$, $c$, inserted into the curved slots $b$, $b$, in the sides of the shoes. The shoes G, G, are suspended by the joint pins $t$, $t$, between the side pieces A, and B, of the frame; $d$, $d$, are the double joint pieces, by which the shoes or cases G, G, are suspended. The rubbers H, H, are suspended to the joint pins $v$, $v$, between the side pieces of the car frame, in a position to act upon the wheels; $f$, $f$, are the joint pieces by which the rubbers are suspended; $e$, $e$, are vertical slots at the upper ends of $f$, $f$, through which the sustaining pins $v$, $v$, pass.

Two small apertures $i$, $i$, pass through the side pieces A, and B, of the car frame, opposite the lower ends of the slots $e$, $e$; by inserting a bolt $j$, through these apertures, and through the slot $e$,—in the joint piece of the rubber acting on the forward wheel,— the rubber will be prevented from lifting, which it otherwise would by the action of the wheel. The forward motion of the after wheel, will prevent the rear rubber from lifting.

$k$, $k$, are hooks for securing the bolt $j$, in its place when inserted into either of the apertures $i$, $i$, Cams $l$, $l$, are placed on each end of the shaft $a$, between the rubber cases or shoes G, G, on one side of the car, and the rubbers K, K, on the other. The rubbers, or brakes K, K, are constructed in any well known or usual manner.

The operation of my improved self detaching brake, is as follows: Previous to starting, the bolt $j$, must be inserted into the forward aperture $i$, passing through the slot in the joint piece $f$, of the rubber (H,) acting on one of the forward wheels, to prevent its rising by the action of the same. The rubbers are pressed against the wheels in the usual manner, through the medium of the bumper C, the bar E, the lever F, and the cams $l$, $l$;—the bumper being acted upon by the locomotive. By reversing the motion of the locomotive and train, one of the after wheels of each car elevates the rubber H, acting upon it, and by so doing, presses the upper end of its joint-piece $f$, against the bar E, and detaches it from the lever F; and thus prevents the brakes from acting while the cars are moving to the rear.

$g$, is a spring acting upon the shaft D, of the bumper, throwing it forward and relieving the rubbers, when the locomotive has ceased to act upon the bumper.

I, is a spring acting on the bar E, and causing the notch on the under side of the same, to take hold on the upper end of the lever F. The brakes may be operated by hand by means of the arm or lever P, on one end of the shaft $a$, the connecting bar $m$, and bent lever $n$, constructed and operated in the usual manner,—save that there is a slot in the lower end of the rod *m*, which permits the pin in the end of the lever P, to play freely in the same, while the brakes are operated by the retarding power of the locomotive.

What I claim as my invention and desire to secure by Letters Patent, is—

The combination and arrangement of the rubbers or brakes H, H, the rubber cases or shoes G, G, joint pieces *f*, *f*, and bolt *j*, with each other, and with the shaft *a*, cams *l*, *l*, lever F, bar E, and bumper C, substantially in the manner, and for the purpose herein set forth.

JOHN LAHAYE.

Witnesses:
  Z. C. ROBBINS,
  GUY C. HUMPHRIES.

[FIRST PRINTED 1913.]